US007219567B2

(12) United States Patent
Porat et al.

(10) Patent No.: US 7,219,567 B2
(45) Date of Patent: May 22, 2007

(54) COMBINATORIAL PIPETTOR DEVICE

(75) Inventors: Amir Porat, Savion (IL); Moshe Gombinsky, Bat Yam (IL)

(73) Assignee: Bio-Magnetics Ltd., Yahud (IL)

( * ) Notice: Subject to any disclaimer, the term of this patent is extended or adjusted under 35 U.S.C. 154(b) by 159 days.

(21) Appl. No.: 11/029,013

(22) Filed: Jan. 5, 2005

(65) Prior Publication Data

US 2006/0144169 A1 Jul. 6, 2006

(51) Int. Cl.
*G01N 1/14* (2006.01)

(52) U.S. Cl. .............................. 73/864.14; 73/863.01; 436/180

(58) Field of Classification Search ............ 73/864.14, 73/863.01, 863.32, 864.24; 436/180
See application file for complete search history.

(56) References Cited

U.S. PATENT DOCUMENTS 3,536,449 A * 10/1970 Astle .......................... 436/179
5,497,670 A * 3/1996 Carl ........................ 73/863.32
5,525,302 A * 6/1996 Astle ...................... 436/180 X
5,647,994 A 7/1997 Tuunanen
5,970,806 A 10/1999 Telimaa
6,235,244 B1 5/2001 Allen
6,372,185 B1 * 4/2002 Shumate et al. ........ 436/180 X
6,409,925 B1 6/2002 Gombinsky
6,415,669 B1 * 7/2002 Carl ........................ 73/864.14
6,416,718 B1 * 7/2002 Maiefski et al. ........ 436/180 X
6,464,942 B2 * 10/2002 Coffman et al. ........ 436/180 X
6,468,810 B1 10/2002 Korpela
6,756,232 B1 6/2004 Schermer
6,780,381 B2 * 8/2004 Yiu ..................... 73/864.14 X
6,793,891 B2 * 9/2004 Yiu ..................... 73/864.14 X
6,869,571 B2 * 3/2005 Ingenhoven et al. .... 436/180 X
6,982,063 B2 * 1/2006 Hamel et al. ........... 436/180 X
2001/0019845 A1 9/2001 Bienert
2004/0013572 A1 1/2004 Moore et al. ................. 422/99
2004/0026444 A1 * 2/2004 DeSilva et al. ...... 73/864.14 X
2004/0231438 A1 * 11/2004 Schwartz ............ 73/863.32 X

FOREIGN PATENT DOCUMENTS

CA 1286389 C * 7/1991
EP 787296 A1 * 8/1997
EP 1214977 A2 * 6/2002
WO WO 99/25476 A2 * 5/1999
WO WO 01/56695 A1 * 8/2001
WO WO 01/57539 A1 * 8/2001
WO WO 02/39084 A2 * 5/2002

* cited by examiner

*Primary Examiner*—Thomas P. Noland
(74) *Attorney, Agent, or Firm*—Edward Langer; Shiboleth Yisraeli Roberts Zisman & Co.

(57) ABSTRACT

A combinatorial pipettor device for the collection of a sample adapted for use with different size microtiter plates. The device comprises an upper plate having first and second halves, each half independently movable between an upper and a lower position, and a lower plate having tip connectors for the attachment of collecting tips. Also included are sample collector members having proximal ends and distal ends and a mechanism for moving at least one half of the upper plate between the upper and lower positions. Proximal ends of the sample collector members are held by the upper plate and distal ends of the sample collector members are engagable with the lower plate such that when at least one half of the upper plate is moved from the upper to the lower position, the corresponding sample collector members are lowered, thereby facilitating collection of a sample into a tip attached to one of the connectors.

20 Claims, 16 Drawing Sheets

COMBINATORIAL PIPETTOR DEVICE

FIELD OF THE INVENTION

The present invention relates to devices for the separation and/or transfer of particles or liquids. More specifically, the present invention relates to a multi-collector combinatorial pipettor device for the separation and/or transfer of magnetic particles or liquids that can be used with microtiter plates of different sizes.

BACKGROUND OF THE INVENTION

Magnetic particles are used for a variety of separation, purification, and isolation techniques in connection with chemical or biological molecules. In those techniques, a magnetic particle is coupled to a molecule capable of forming a specific binding ("affinity binding") with a molecule in a biological sample, which is to be isolated, purified or separated. The biological sample is then brought into contact with the magnetic particle and those biological molecules which bind to the magnetic particles are then isolated by application of a magnetic field.

Magnetic microparticles or nanoparticles are used to bind DNA molecules, proteins, cells, and sometimes subcellular fragments. In recent years, magnetic microparticles have been used as solid phase for chemical synthesis. Microparticles are in the size of 0.5-10 micron while nanoparticles are 0.05-0.3 micron.

Various devices and methods have been developed in order to separate and transfer magnetic particles. Generally, the available methods fall under two categories. In the first method, a specialized magnetic suspension vessel is contacted with a magnet, and particles move towards the magnet, thus becoming attached to the side of the vessel. The remaining liquid is removed out of the vessel via decantation or aspiration.

In the second method, cylindrical magnetic rods covered with protective plastic sleeves or tips are brought into direct contact with a magnetic suspension. Particles are captured on the rod while the liquid remains in vessel. The rod with captured particles is moved into another vessel. When the magnet is withdrawn out of the protective sleeve, particles detach from the tip into the vessel.

The second method is advantageous with respect to the first, since a stronger magnetic field is applied directly on the particles, and therefore, nearly all of the particles are captured. Another advantage is that since the particles are readily transferred to a second vessel, removal of liquid in the source vessel is not needed, and one step has been saved.

Patent No. EP 0787296 to Tuunanen describes a magnetic rod device for the separation of microparticles. The tip of the device is shaped like a cone for transferring particles from large volumes into smaller volumes. The device, however, is only useful for separating one sample at a time.

U.S Pat. No. 6,409,925 to Gombinsky et al. describes a system of magnetic rod devices wherein each device in the system is independently controlled. Thus, any desired combination of magnetic rods can be operated. The magnets in this system are operated via pneumatic forces that are automatically controlled. The system permits transfer of specific combinations of magnetic particles and thus it can be used for combinatorial chemical synthesis. A magnetic plate is provided beneath the microtiter plates for facilitating separation of the magnetic particles from the tip into liquid in the well.

U.S. Pat. No. 6,468,810 to Korpela describes a similar rod device for capturing and releasing magnetic microparticles. The magnets in this device are operated via springs. An extendible membrane is provided as well as means for joining and separating the magnet with the first side of the membrane such that in operation the magnet is releasably pressed against the first side of the membrane, thereby stretching the membrane so that microparticles become fixed, by magnetic attraction, to the second side of the membrane. When the magnet is separated from the first side of the membrane, the particles become released from the second side.

In all of the aforementioned references, the magnetic rod moves inside of a static tube either electrically, pneumatically, or manually. The protective sleeve or tip covering the magnet is attached to the end of the static tube, and is detached or released from the tube by an outside mechanism, usually a manual arm attached to the outside surface of the tube.

U.S. Pat. No. 5,970,806 to Telimaa et al. relates to a multi-cylinder pipette comprising 16 4.5 mm spaced channels. The pipette is thus suitable only for use with a plate comprising 16×24, or 384 wells.

U.S. Pat. No. 6,235,244 to Allen et al. relates to a uniformly expandable multi-channel pipettor having a plurality of tip fittings whose spacing can be adjusted so that the spacing between each adjacent tip fitting is substantially identical. The device is known as the Equalizer 384 ™ by Matrix, and it allows the user to switch between microtiter plates of different sizes. The tip fittings are attached one to another by a linkage such as a pantographic linkage. The spacing is limited by an adjustable, slidable stop. Uniformly increasing and decreasing the spacing is accomplished by pulling and pushing a rod attached to one tip fitting. However, the Equalizer is a highly complicated device, and it is very expensive.

A disadvantage of prior art devices is that they cannot be used with microtiter plates of different sizes, only with one-size plates. Pipettor devices with eight connectors are for use with 96-well plates and pipettor devices with sixteen connectors are for use with 384-well plates. Patent EP 0787296 allows for the transfer of particles between microtiter plates having different sizes, but this is with the use of a single magnetic rod, and thus it cannot be used in combinatorial applications.

In light of the above, it would be desirable to provide a combinatorial device for the separation and transfer of magnetic particles or liquids that can be used with microtiter plates of different well sizes, and that would allow the user to determine the exact combination of samples that are to be separated and transferred.

SUMMARY OF THE INVENTION

Accordingly, it is a principal object of the present invention to provide a combinatorial pipettor device that is adapted for use with microtiter plates (also known as "Micro-well plates" or "Nano plates" or "deep well plates") of different sizes, for example 96-well (8×12 wells) and 384-well (16×24 wells), though other size microtiter plates could also be possible. The device can be used for the separation of magnetic particles or for the collection and transfer of liquids. The device is adapted for being set by the user according to the exact number and positioning of the samples that are to be processed.

In accordance with a preferred embodiment of the present invention, there is provided a combinatorial device for the collection of a sample, adapted for use with microtiter plates of different sizes, comprising;

(a) an upper plate comprised of a first half and a second half, wherein each of the halves is independently movable between at least an upper position and a lower position;

(b) a lower plate having a plurality of tip connectors coupled thereto for facilitating attachment of at least one collecting tip;

(c) a plurality of sample collector members each having a proximal end and a distal end;

(d) a mechanism for moving at least one of the first half and the second half of the upper plate between the upper position and the lower position;

wherein the proximal ends of the sample collector members are held by the first and second halves of the upper plate and wherein the distal ends of the sample collector members are adapted for being engaged by the lower plate such that when at least one half of the upper plate is moved from the upper position to the lower position, the corresponding sample collector members are lowered with respect to the lower plate, thereby facilitating collection of at least one sample into a collecting tip attached to one of the connectors.

According to preferred embodiments of the present invention, each of the first half and the second half of the upper plate is adapted for accommodating eight sample collector members, for a total of sixteen sample collector members. By moving the first upper plate half (8 sample collector members), the second upper plate half (8 sample collector members) or both halves together (16 sample collector members), the user is able to transfer magnetic particles or liquids from 96-well-plates (having 12 rows of 8) to a 384-well-plates (having 24 rows of 16).

Alternatively, according to preferred embodiments of the present invention, each of the first half and the second half of the upper plate is adapted for accommodating twelve sample collector members, for a total of twenty-four sample collector members.

Further according to preferred embodiments of the present invention each of the first half and the second half of the upper plate comprises a plurality of projections, the projections of the first half being complementary in shape to the projections of the second half such that the two plate halves fit together, and wherein each of the projections comprises an opening for receiving the proximal end of a sample collector member.

Still further according to preferred embodiments of the present invention, the sample collector members comprise pins and the lower plate comprises a plurality of pump units, the connectors defining the lower portions of the pump units and the pins being adapted for engaging with and activating the pump units when at least one half of the upper plate is moved to the lower position such that a liquid can be collected into a collecting tip attached to one of the connectors.

Additionally according to preferred embodiments of the present invention, the sample collector members comprise rod-shaped magnetic elements.

Moreover according to preferred embodiments of the present invention, the lower position corresponds to a position in which the distal ends of the magnetic elements extend through the lower plate and into the tip connectors such that when a collecting tip is attached to a tip connector, a magnetic force is exerted by the distal end of the magnetic element onto the end of the collecting tip such that magnetic particles can be collected onto the collecting tip due to the magnetic force.

Further according to preferred embodiments of the present invention, the mechanism comprises an actuator button comprising a first button half adapted for enabling moving the first half of the upper plate and a second button half adapted for enabling moving the second half of the upper plate.

Still further according to preferred embodiments of the present invention, at least a portion of the tip connectors are switchable between an inactivated position and an activated position, the activated position corresponding to a position in which the tip connectors can be employed for collection of a sample when at least one collecting tip is attached thereto.

Additionally according to preferred embodiments of the present invention, the lower plate comprises a first lower plate half and a second lower plate half, the first lower plate half having a plurality of tip connectors coupled thereto, the tip connectors on the lower plate half being provided in the activated position.

Moreover according to preferred embodiments of the present invention, the second lower plate half comprises a plurality of tip connectors provided in the inactivated position, and the device further comprises means for switching the tip connectors to the activated position. Preferably, the means comprises a lock button. Unlocking the lock button causes the second lower plate half to move downward, thus causing the corresponding tip connectors to switch from the inactivated position to the activated position.

Further according to preferred embodiments of the present invention, the device also includes a release button for enabling release of used tips from the device.

Still further according to preferred embodiments of the present invention, the release button operates by enabling the upper plate halves to be lowered such that the distal ends of the magnetic elements push against attached collecting tips, causing the collecting tips to become released from the tip connectors.

It is a feature of the present invention that individual tip connectors are adapted for being inactivated by at least partially pushing the individual tip connector inward towards the lower plate. In one embodiment, individual tip connectors are adapted for being inactivated by disconnection of the individual tip connector from the lower plate. In other embodiments, a plurality of tube members are provided that are adapted for being connected to the tip connectors. The added length provided by the tube members produces an effect that only those tip connecters with tube members attached thereto will become connected to a collecting tip. In yet another embodiment, the tip connectors are adapted for being partially or completely pushed into the main body of the device. The user simply pushes in those tip connectors which are not needed. Thus, the step of having to remove unnecessary tips from the tip box by hand has been saved.

It is a further feature of the present invention that a mechanism can be provided for activating individual tip connectors wherein lowering of an individual magnetic element into a tip connector causes the tip connector to switch to the activated position. In one embodiment, a slide mechanism is provided whereby, in the inactivated state, the connector is positioned inside of the main body of the device. When a magnetic element is lowered into the connector, it pushes against the connector, causing it to extend from the main body of the device by a predetermined measured amount.

According to preferred embodiments of the present invention, there is also provided a method for collecting and transferring a sample from a microtiter plate, comprising providing a combinatorial device for the collection and transfer of a sample, the device being adapted for use with microtiter plates of different sizes, and the device comprising:

(a) an upper plate comprised of a first half and a second half, wherein each of the halves is independently movable between at least an upper position and a lower position;

(b) a lower plate having a plurality of tip connectors coupled thereto for facilitating attachment of at least one collecting tip;

(c) a plurality of sample collector members each having a proximal end and a distal end;

(d) a mechanism for moving at least one of the first half and the second half of the upper plate between the upper position and the lower position;

wherein the proximal ends of the sample collector members are held by the first and second halves of the upper plate and wherein the distal ends of the sample collector members are adapted for being engaged by the lower plate, and the method further comprising moving at least one half of the upper plate from the upper position to the lower position such that the corresponding sample collector members are lowered with respect to the lower plate, thereby facilitating collection of at least one sample into a collecting tip attached to one of the connectors.

Further features and advantages of the present invention will become more readily apparent and understood from the detailed description of the invention provided below.

BRIEF DESCRIPTION OF THE DRAWINGS

For a better understanding of the invention with regard to the embodiments thereof, reference is made to the accompanying drawings, in which like numerals designate corresponding elements or sections throughout and in which.

DETAILED DESCRIPTION OF PREFERRED EMBODIMENTS

Reference will first be made to FIGS. 1-8, which illustrate various views of a combinatorial pipettor device 12 for the separation and transfer of magnetic particles, according to a preferred embodiment of the present invention.

Figure 14:
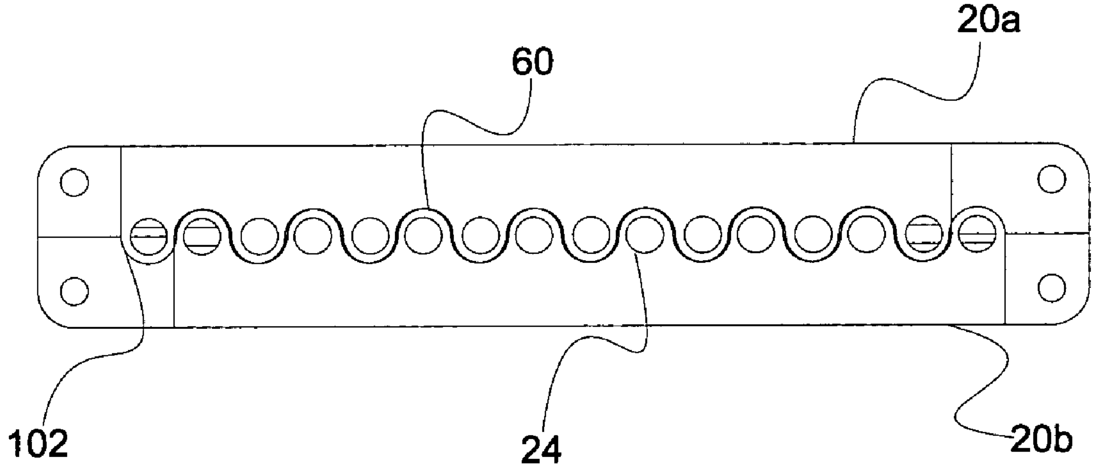
FIG. 14 represents a top view of the upper plate of the device of FIG. 12.

Device 12 comprises two plates: an upper plate, comprised of a first upper plate half 20*a* and a second upper plate half 20*b* each of which are movable between an upper position and a lower position; and a lower plate, comprised of a first lower plate half 22*a* and a second lower plate half 22*b*. In FIG. 14, it is possible to see the upper plate as a complete unit whereas in FIG. 1-4, one half of the upper plate has been moved down with respect to the other half. Upper plate halves 20*a*, 20*b* are complementary in shape with one another, as shown in FIG. 14, which will be further described below. Upper plate halves 20*a*, 20*b* have a plurality of openings 24 for holding the proximal ends 26*a* of a plurality of magnetic elements 26, such that when one or both halves 20*a*, 20*b* move down, magnetic elements 26 which are maintained thereon move down correspondingly. It will be appreciated that magnetic elements do not move independently; they move only in conjunction with the upper plate.

An actuator button having two halves 90*a*, 90*b* is provided for operating device 12. Actuator button half 90*a* is operably coupled to upper plate half 20*a*; actuator button half 90*b* is operably coupled to upper plate half 20*b*. When activated, upper plate halves 20*a*, 20*b* slide downward along two pairs of poles 10.

Lower plate halves 22*a*, 22*b* are complementary in shape to one another in a manner similar upper plate halves 20*a*, 20*b*. Openings in lower plate halves 22*a*, 22*b* are for receiving the distal ends 26*b* of magnetic elements 26. A plurality of connectors 34 are located on lower plate halves 22*a*, 22*b* for facilitating connection of at least one collecting tip to device 12.

Figure 1:
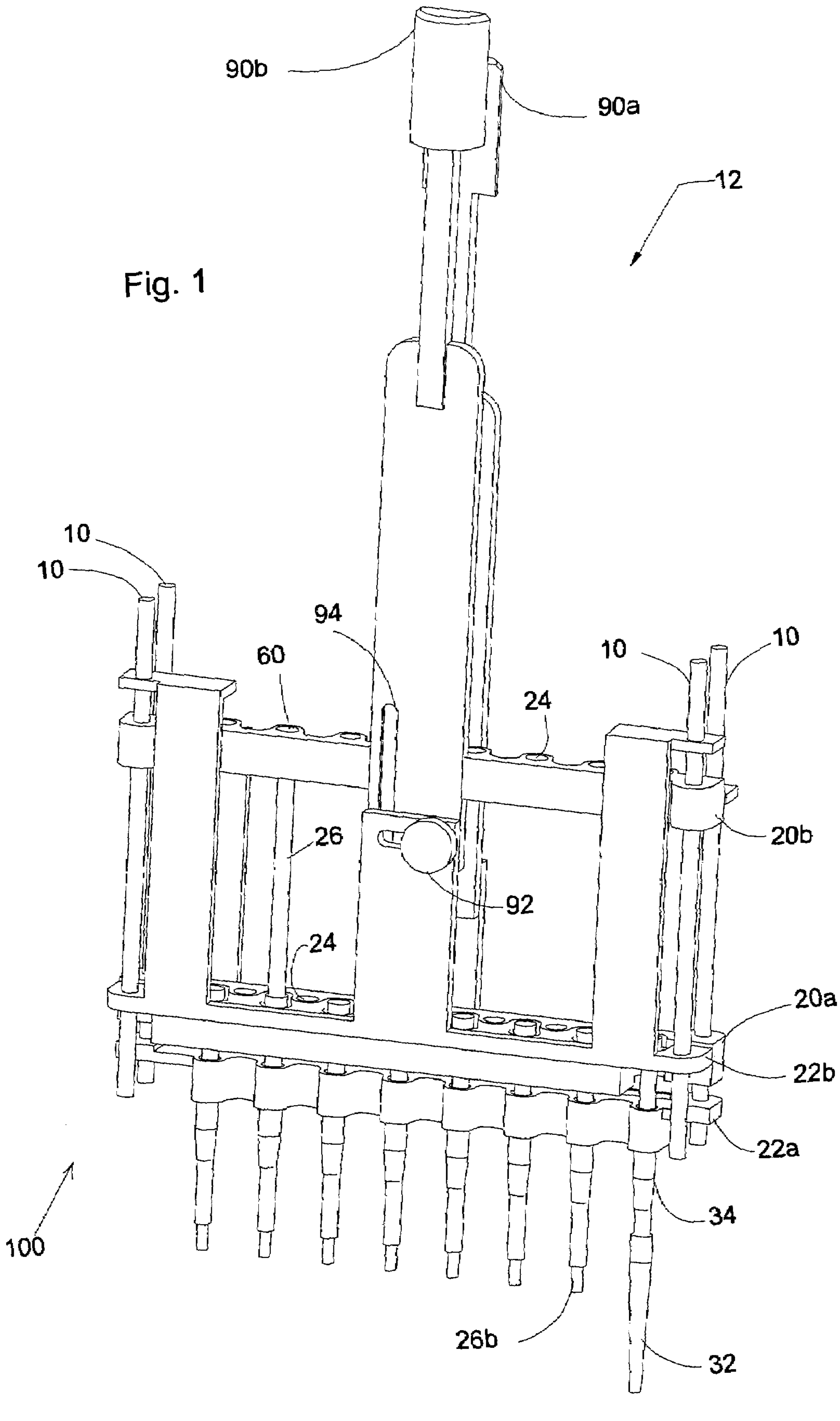
FIG. 1 represents a perspective view of a first preferred embodiment of the combinatorial device of the present invention, with the cover of the device removed.

In FIG. 1, eight sample collector members, associated with the first half of the upper plate, have been lowered; the second half of the upper plate, and thus the eight sample collector members associated therewith, remain in the upper position.

Preferably, first lower plate half 22*a* is non-movable; and connectors 34 located on the lower boundary of lower plate half 22*a* are provided in the activated position ("activated position" refers to a position in which a connector, in combination with an attached collecting tip, can be used for collection of a sample). Second lower plate half 22*b*, however, is movable; connectors 34 located on the lower boundary of lower plate half 22*b* are initially provided in the non-activated position (non-activated or inactivated position refers to a position in which a connector cannot be employed for collection of a sample), in which the connectors 34 are at least partially located within the main body 100 of device 12. When lower plate half 22*b* is lowered, connectors 34 attached thereto become lowered, thereby assuming the activated position.

Figure 5:
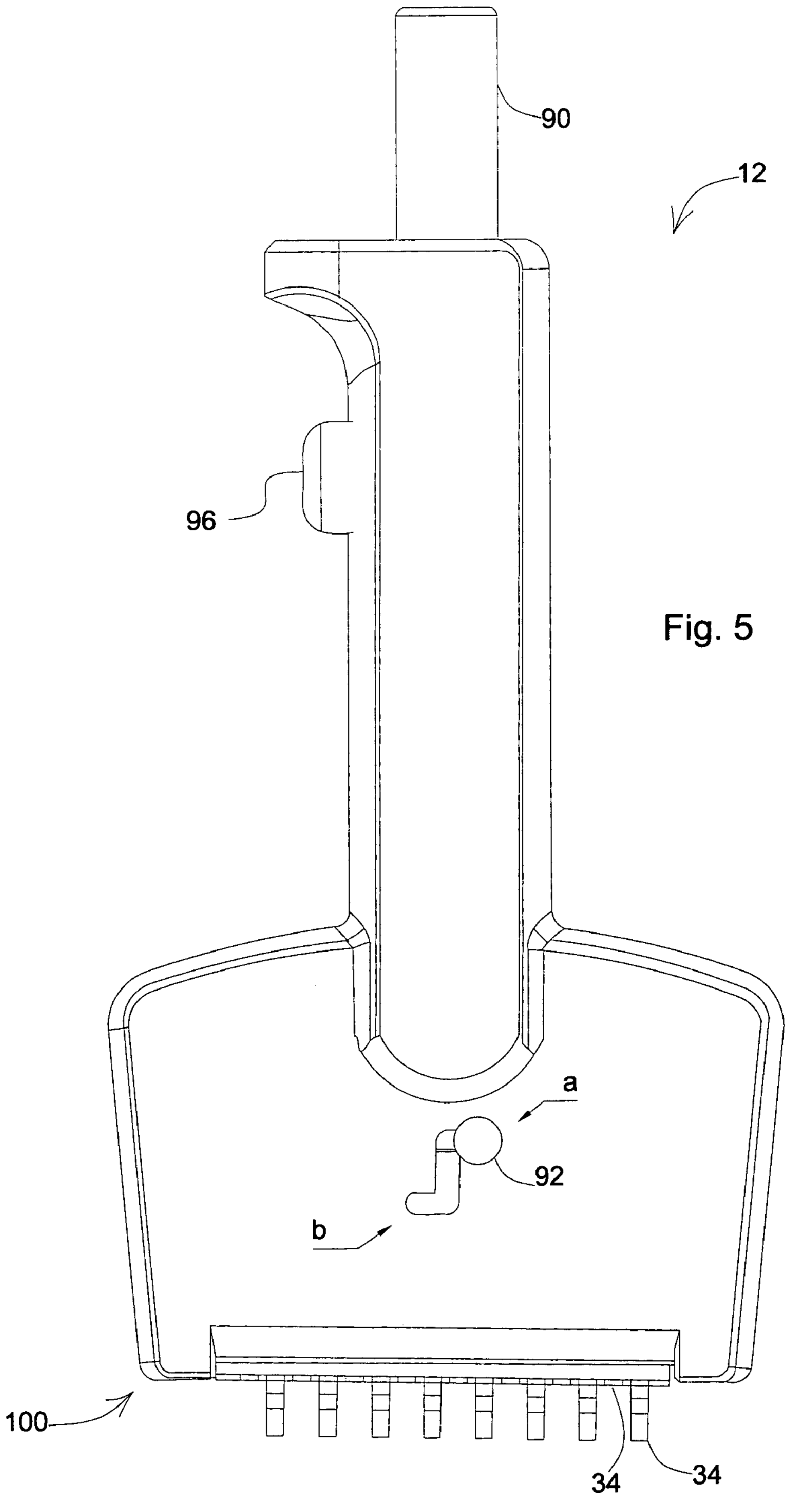
FIG. 5 represents a side view of the device of FIG. 1, with the lock button in the locked position.
Figure 6:
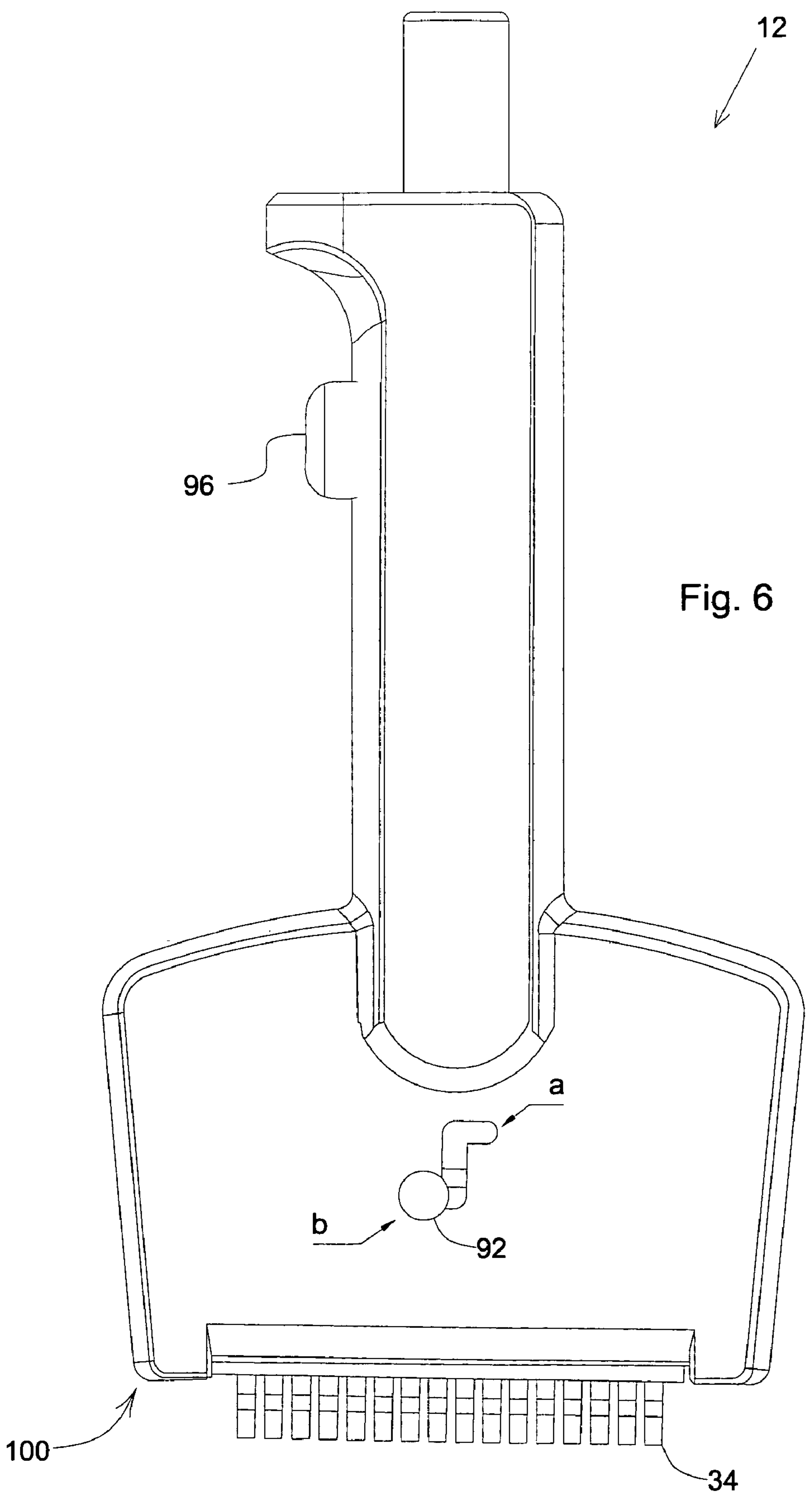
FIG. 6 represents a side view of the device of FIG. 1, with the lock button in the unlocked position.

A lock button 92 is provided whereby connectors 34 located on lower plate half 22*b* can be switched by the user from the non-activated to the activated position and vice-versa. FIGS. 5 and 6 clearly illustrate lock button 92. When in locked position a, only connectors 34 from the first lower plate half 22*a* are in the activated position outside of the main body 100 of the device 12 (FIG. 5). When switched by the user to unlocked position b (FIG. 6), connectors 34 from the second lower plate half 22*b* also become activated, and thus can be seen outside of the device main body 100. Switching of lock button 92 from position a to position b causes lower plate half 22*b* to become lowered, thereby extending connectors 34 associated therewith by a predetermined amount from the device body.

Unlocking of lock button 92 also allows for actuator button half 90*b* to be used. When in locked position a, only actuator button half 90*a* may be pressed, and thus only upper plate half 20*a* can be lowered. When in unlocked position b, both button halves 90*a* 90*b* can be pressed for lowering both upper plate halves 20*a* 20*b*. In unlocked position b, a channel 94 engages lock button 92, thereby allowing for downward movement of actuator button half 90*b* whereas in locked position a, movement is prevented by lock button 92.

Figure 7:
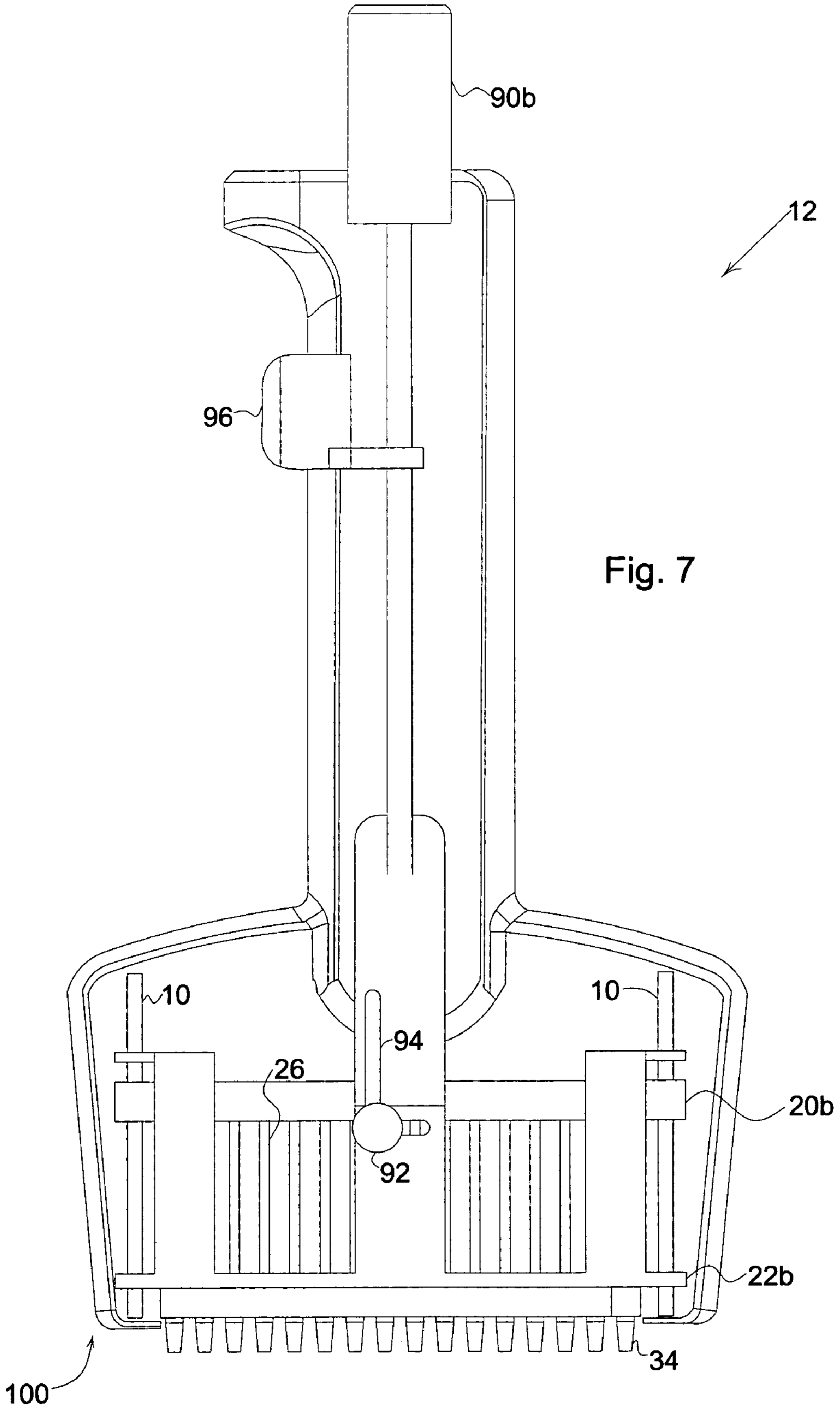
FIG. 7 represents a side view of the device of FIG. 1, with the cover removed and with all tip connectors in the activated position.
Figure 8:
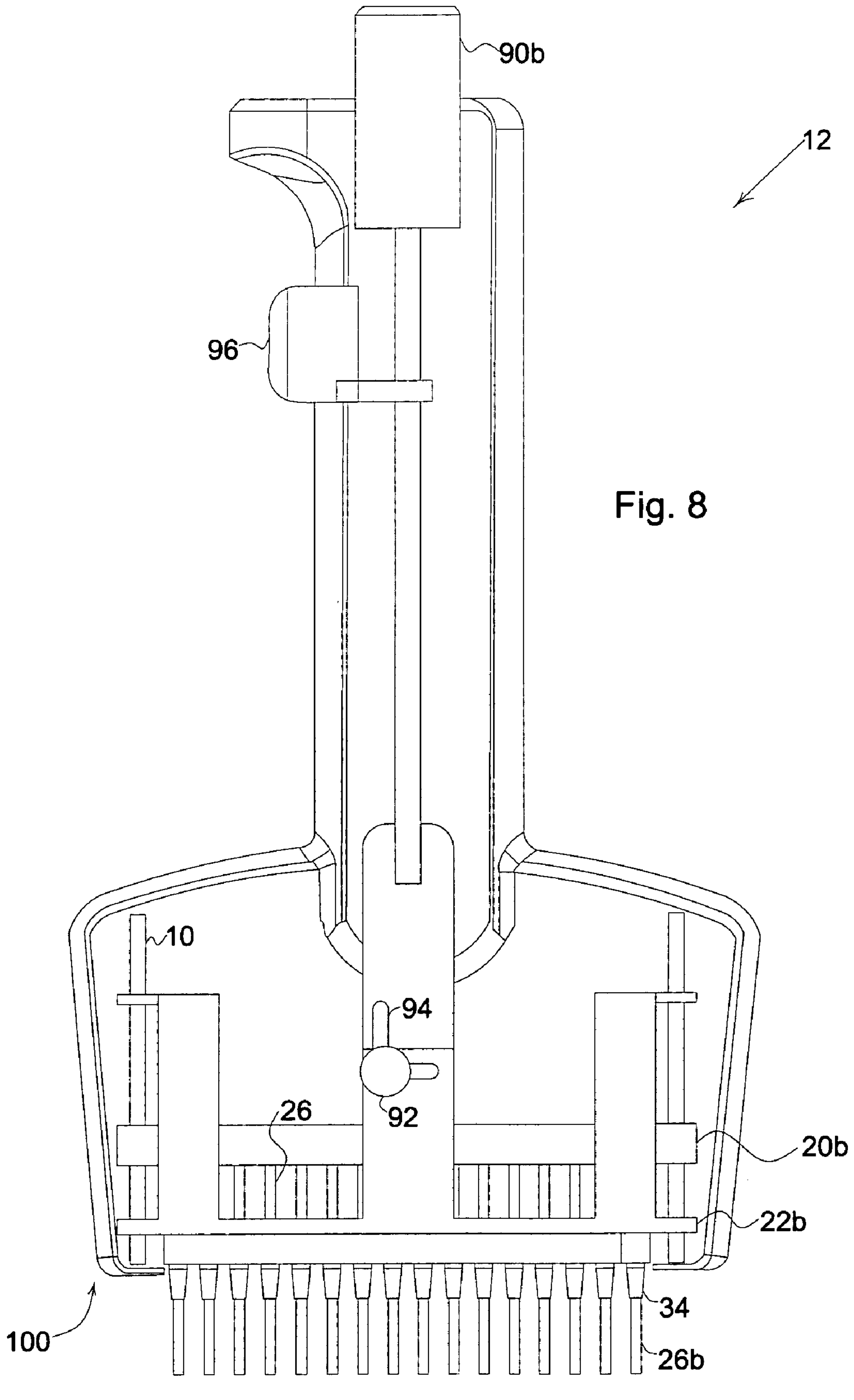
FIG. 8 represents a side view of the device of FIG. 1, with the cover removed and with both halves of the upper plate in the lowered position.
Figure 9A:
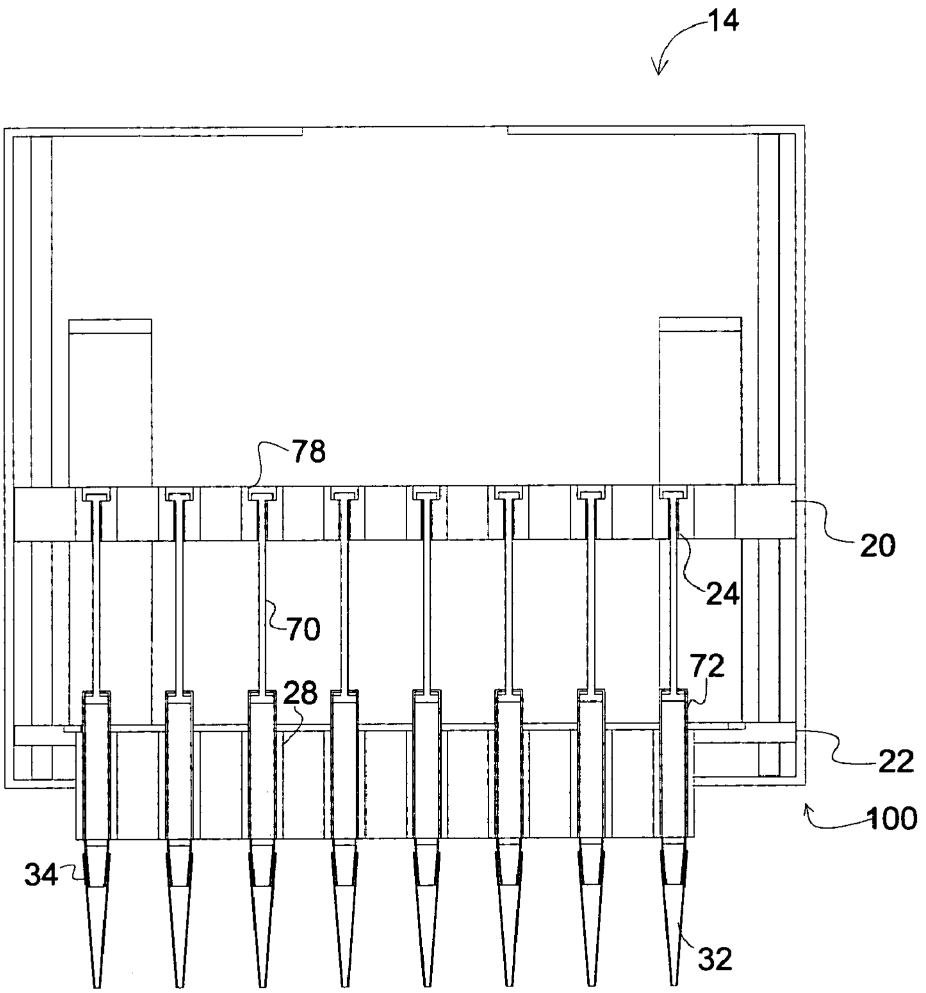
FIG. 9*a* represents a schematic side view of a second preferred embodiment of the combinatorial device of the present invention.
Figure 9B:
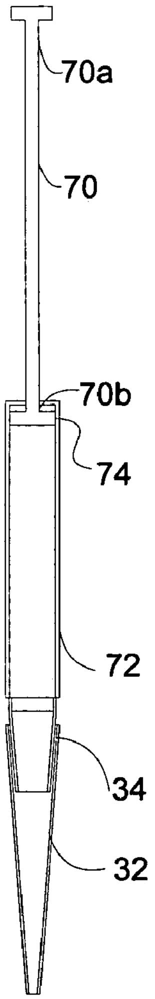
FIG. 9*b* represents a schematic view of a single pump unit of the device of FIG. 9*a;*

According to the number and positioning of samples that are to be processed, the user determines whether only one or both halves of device 12 are to be employed. In FIGS. 1-4, lock button 92 is in locked position a and thus only upper plate half 20*a* and lower plate half 22*a* are being used. In FIGS. 7 and 8, lock button 92 is in unlocked position b and thus both upper plate halves 20*a*, 20*b* and both lower plate halves 22*a*, 22*b* are being employed.

In the device illustrated, each upper plate half 20*a*, 20*b* can accommodate up to 8 magnetic elements, for a total of sixteen. In situations where between 1-8 samples need to be processed, only actuator button half 90*a* needs to be employed. When 8-16 samples need to be processed, both actuator button halves 90*a*, 90*b* a re employed, thus activating both halves of the upper plate. It will be appreciated that device can be designed to accommodate other combinations of magnetic elements as well, for example, 12 on each upper plate half.

Each lower plate half is aligned with the corresponding upper plate half so as to receive the distal ends of magnetic elements held by the upper plate. Thus, each lower plate half has the same number of openings as the corresponding upper plate half.

Figure 2:
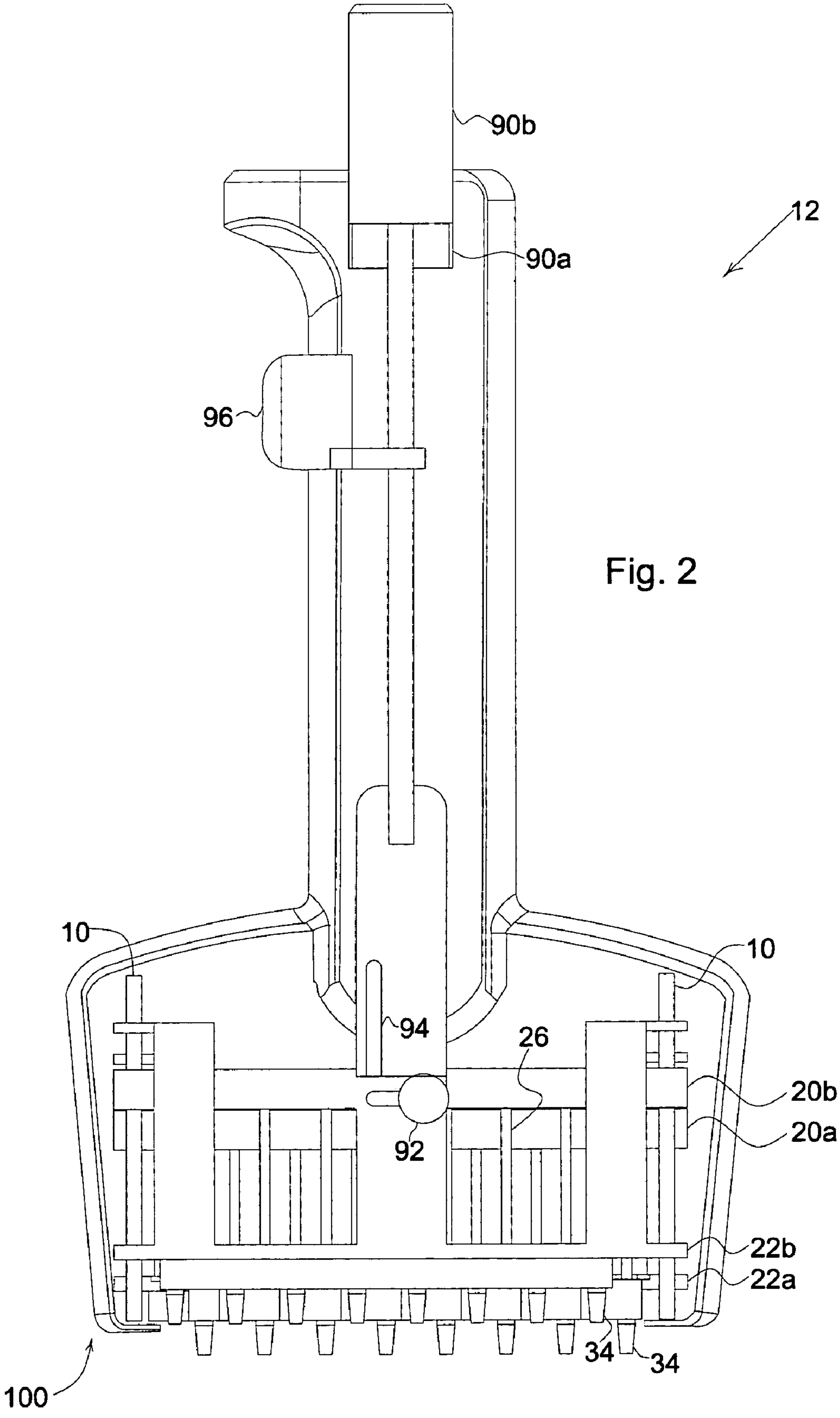
FIG. 2 represents a side view of the device of FIG. 1, with the cover of the device removed and with half of the upper plate of the device partially lowered.
Figure 3:
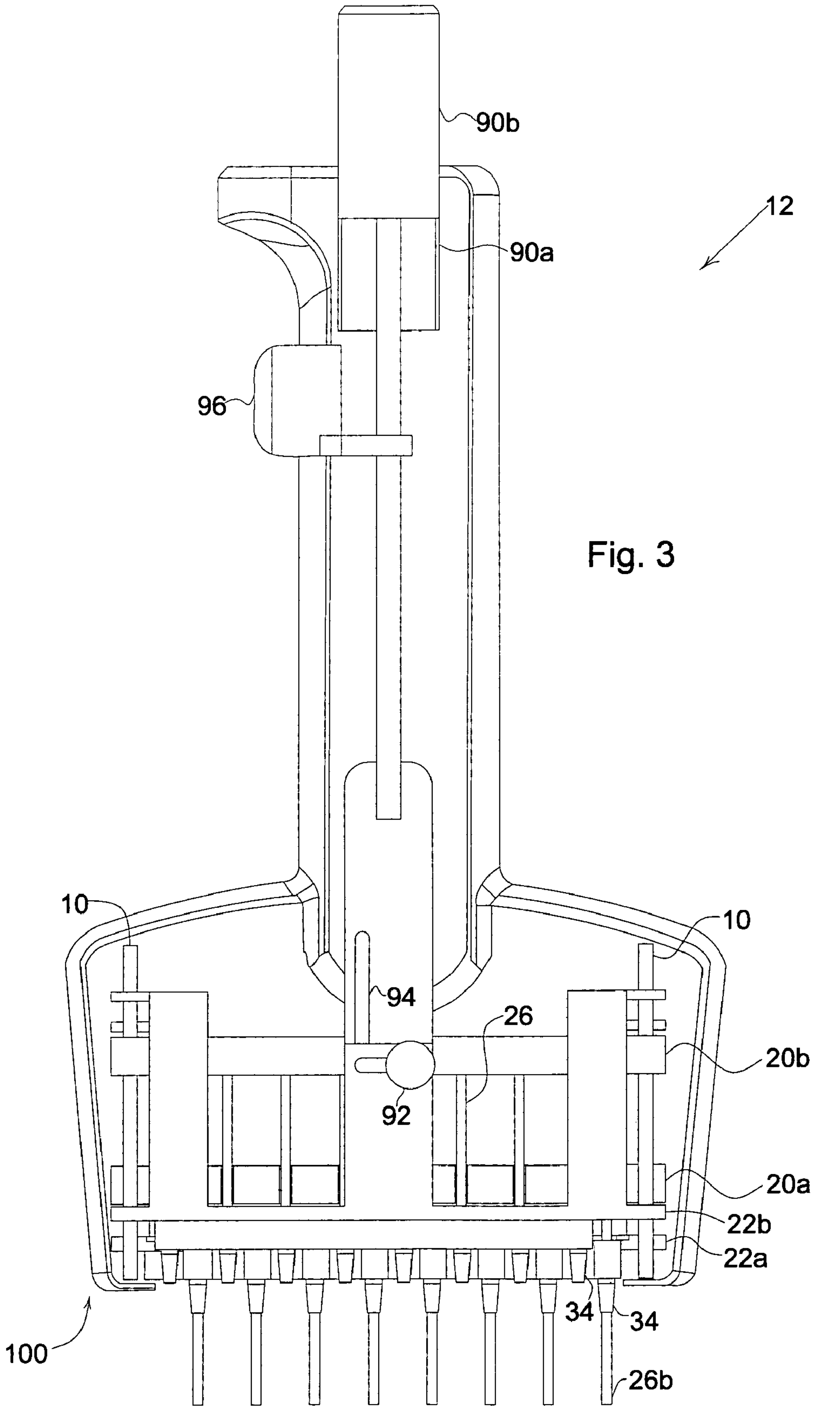
FIG. 3 represents a side view of the device of FIG. 1, with the cover of the device removed and with half of the upper plate of the device lowered such that magnetic elements extend from the tip connectors.

In FIG. 2, upper plate half 20*a* is partially lowered. Eight connectors 34 associated with lower plate half 22*a* a re seen activated outside of the device main body 100. When upper plate half 20*a* is fully lowered, eight magnetic elements 26 connected at the proximal end 26*a* to upper plate half 20*a* extend through connectors 34 on lower plate half 22*a* (FIG. 3). Tips 32 (not shown in FIG. 3) can then be attached to connectors 34 and magnetic particles can be collected onto the tip 32 due to the magnetic force of the distal end 26*b* of magnetic element 26 onto the tip (in FIG. 4, only one collecting tip 32 is illustrated, for purposes of example only).

It will be appreciated that for the collection of magnetic particles, a specialized collecting tip is employed which has a thin membrane having a thickness of about 30 microns or less at the very tip portion thereof. A membrane of such size maximizes the magnetic force on the sample, creating a "button" of nearly all of the magnetic particles on the membrane. This was disclosed previously in U.S. Pat. No. 6,409,925 to the same inventor.

Thus, in operation of the device, when eight or fewer samples are to be processed, the user presses down on actuator button half 90*a*, thus causing upper plate half 20*a* and associated magnetic elements 26 to become lowered. While button 90*a* is pressed, magnetic particles can be collected, for example by lowering of attached collecting tips into wells containing magnetic particles suspended in a liquid. Magnetic particles are attracted to the tips as a result of the magnetic force of the distal ends 26*b* of magnetic elements 26 on the collecting tips 32. The device is then transferred to the target vessel and actuator button half 90*a* is released, thus removing the magnetic force from the tips via raising of the magnetic elements to their original location. The magnetic particles can thus be released from the tips.

Figure 4:
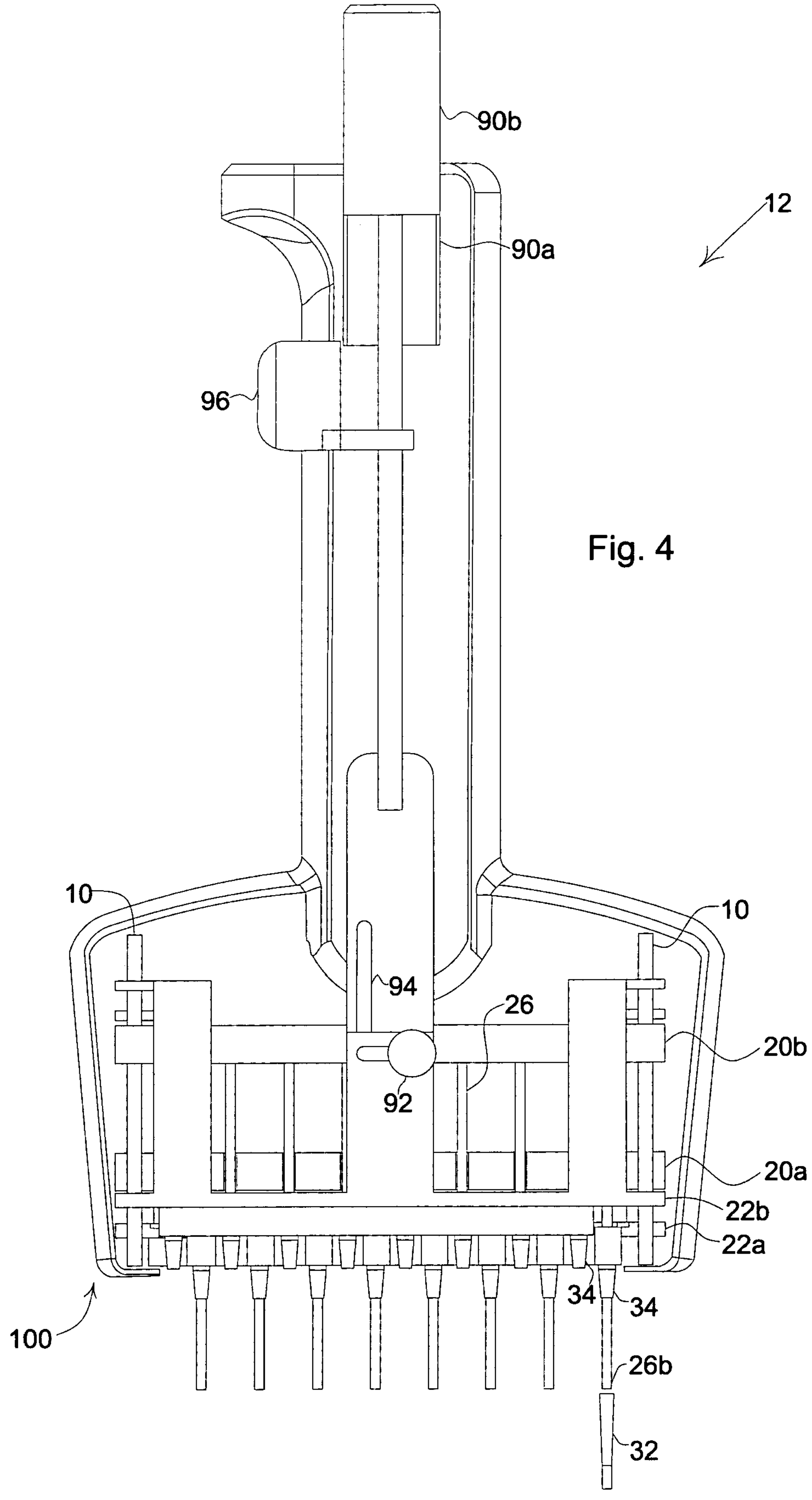
FIG. 4 represents a side view of the device of FIG. 1, with the cover of the device removed and with half of the upper plate of the device further lowered such that used tips are released from the device.

To release used tips, a release button 96 is provided on device 12 which, when pressed inward, enables the user to press down on actuator button half 90*a* to a further extent than previously (FIG. 4). Upper plate half 20*a* thus becomes lowered further than it was during collection of the magnetic particles, and magnetic elements 26 are correspondingly lowered. Due to this action, the distal ends 26*b* of magnetic elements 26 press onto the ends of the tips 32, causing them to be released from connectors 34.

In FIGS. 7 and 8, lock button 92 is in unlocked position b. Sixteen connectors 34 are activated, eight from each half of lower plate 22*a*, 22*b*. When both halves of actuator button 90*a*, 90*b* are pressed, both halves of upper plate 20*a* 20*b* become lowered, and, in the example illustrated, sixteen magnetic elements 26 extend through connectors 34 (FIG. 8) for collection of sixteen magnetic particle samples. Used tips are released in the same manner as described above, with both halves of the actuator button 90*a*, 90*b* being pressable to a further extent than previously.

It will be appreciated that the user can choose the number and combination of connectors that are to be employed according to the number of samples and their positioning in the microtiter plate. When eight or less samples are being separated, only the first side of the device needs to be used. When between nine and sixteen samples are being processed, the second half of the device is used as well.

In order to provide the user with the ability to collect any number and combination of samples, the device of the present invention is preferably provided with at least a portion of tip connectors that can be inactivated by the user. In this case, prior to attachment of collecting tips, the user disconnects individual connectors which are not required, as determined by the number of samples to be processed and their position in the plate. As an example, if only three samples need to be processed, then five out of the eight connectors located on the first half of the lower plate are inactivated by the user (connectors from the second half of the lower plate are initially provided in the inactivated state and thus do not require deactivation). The remaining combination of three connectors are then used for attachment of collecting tips to the device.

Detachment of the connectors from the device can be accomplished, for example, by a screw mechanism, wherein each connector can be screwed and unscrewed from the lower plate, or by any other appropriate means. Alternatively, the tip connectors may be adapted for being partly or completely pushed inside of the main body of the device. The user pushes in connectors which are not needed. The connectors can be pulled out when they are required.

In some embodiments, magnetic elements are provided separate from the rest of the device and the user inserts magnetic elements into the device according to the number and combination of samples to be processed. In FIG. 1, for example, only one magnetic element 26 is present on the second upper plate half 20*b*, whereas the first upper plate half 20*a* has eight magnetic elements 26. In FIGS. 2-8, all sixteen magnetic elements are present.

A second preferred embodiment for the combinatorial pipettor device 14 of the present invention will now be described with reference to FIGS. 9*a*, 9*b*, 10*a*, 10*b*, and 11. This embodiment operates in a manner similar to the previous embodiment, and only those features that differ have been illustrated and will be discussed below.

Device 14 is adapted for use for the transfer of liquids and comprises a plurality of pump units, each of which includes: a pin 70 having a proximal end 70*a* held by the upper plate 20 and a distal end 70*b*; a plurality of suction tubes 72 maintained by lower plate 22; a piston 74 movably disposed within each suction tube 72. It will be appreciated that the pump unit described is well known in the art and is readily available. In this embodiment, connectors 34 are defined by the lower portion of the suction tubes 72.

It will be appreciated that though only "half" of the device is illustrated, this embodiment, like the previous one, preferably includes an upper plate comprising two complementary halves which can be independently operated. Thus, though only eight pump units are shown, the device preferably has sixteen pump units, eight of which are activated by each half of the upper plate. Likewise, only one half of the upper plate can be seen, though the reference numeral used is 20. A simplified version has been illustrated for the purposes of clarity only. It is noted however, that this embodiment, and other ones described, could be readily modified so as to include an upper plate having only one main movable part, instead of two, and thus the device would resemble FIG. 9*a*. Such a device would be simpler but it could not be used for combinatorial purposes.

Figure 10A:
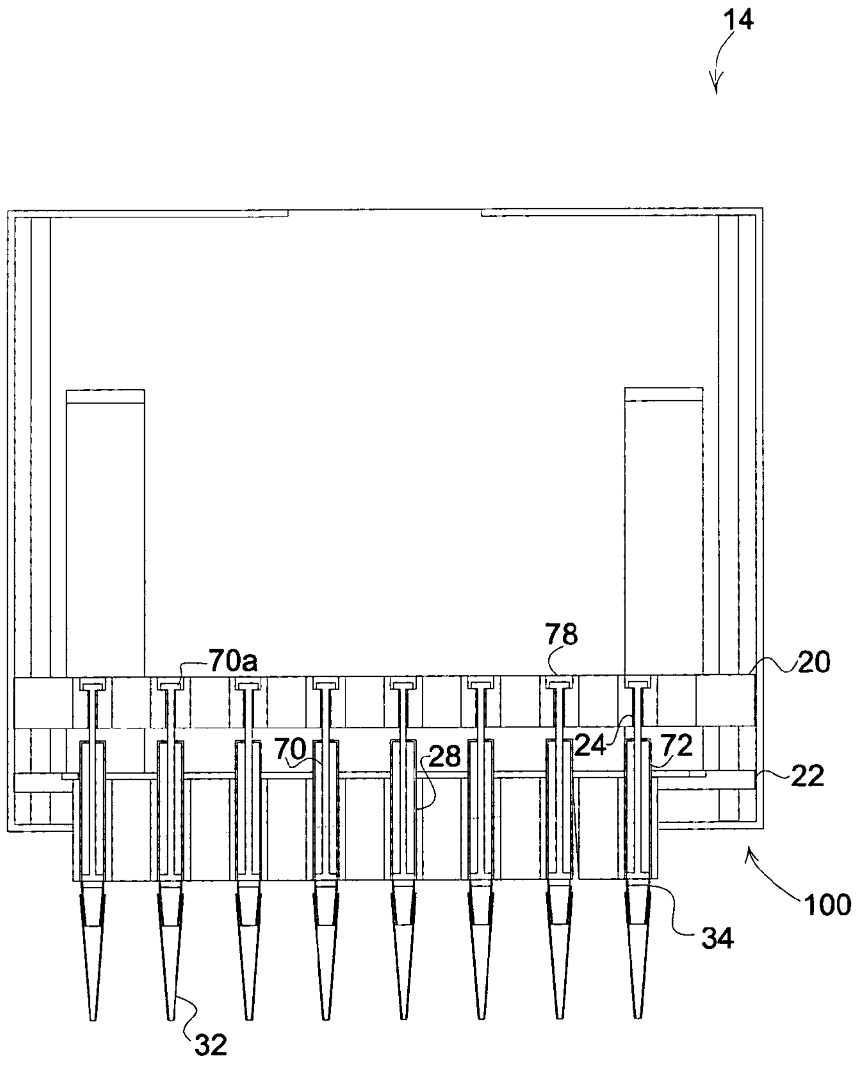
FIG. 10*a* is the same as FIG. 9*b*, except that half of the upper plate of the device have been lowered.
Figure 10B:
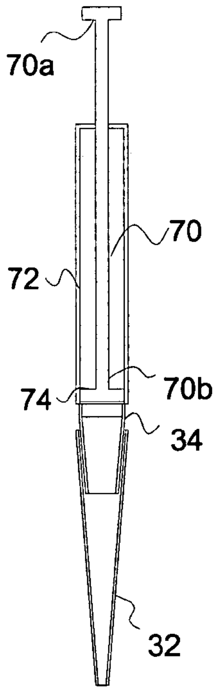
FIG. 10*b* is the same as FIG. 9*b*, except that the pump unit is illustrated in a different configuration.

Upper plate 20 is switchable between an upper position (FIG. 9*a*) and a lower position (FIG. 10*a*) via an actuator button (not shown) operating in a similar manner as the actuator button of the previous embodiment. In the upper position, distal ends 70*b* of pins 70 are located at the top of suction tubes 72 (see FIG. 9*b*). When upper plate 20 is lowered, pin 70 pushes against piston 74, causing piston 74 to move downward inside of suction tube 72 (FIGS. 10*a* and 10*b*). When the actuator button is released, upper plate 20 moves up, pin 70 is raised and piston 74 moves back up correspondingly. The extent to which each of these events takes place is determined by the amount of liquid that is to be drawn into collecting tip 32 attached to connector 34.

When a liquid is to be drawn into collecting tips 32, the actuator button is pressed such that piston 74 becomes lowered inside of tube 72. The tips are then inserted into the liquid and then the actuator button is released, thereby effecting drawing in of a predetermined amount of liquid. When the liquid is to be released into a target vessel, the actuator button is again pressed, causing pistons 74 to move downward and thus expelling liquid in the collecting tips.

Figure 11:
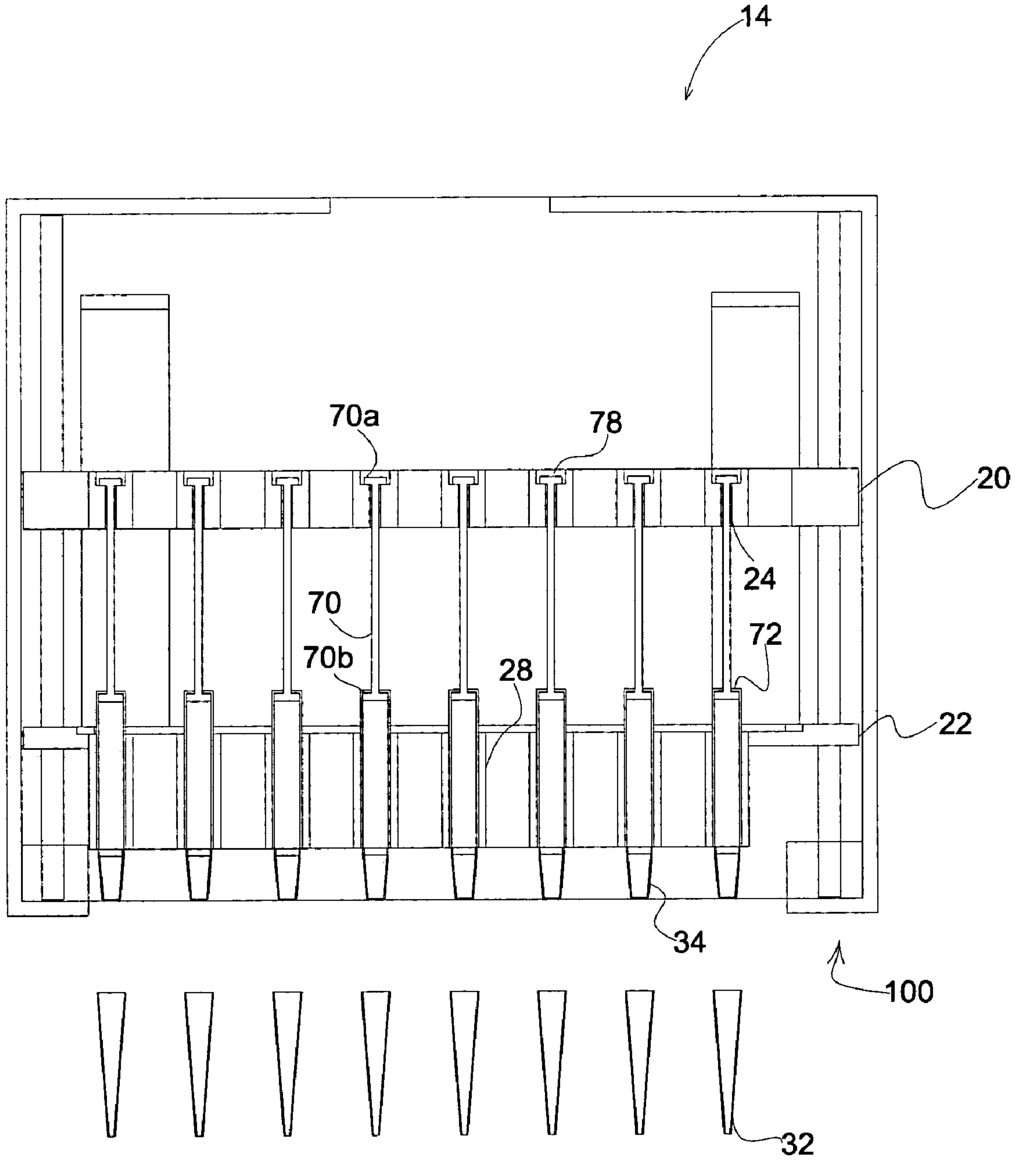
FIG. 11 represents a further side view of the device of FIG. 9*a*, illustrating how a plurality of used tips are released from the device.

The mechanism for releasing used tips differs from that of the previous embodiment. In this embodiment, to release used tips 32, upper plate 20 is raised such that the distal ends 70*b* of pins 70 clear suction tubes 72 (FIG. 11). This could be accomplished, for example, by raising the actuator button or by an external switch coupled to upper plate 20. Next, lower plate 22 is raised, for example, via an external switch, such that connectors 34 enter inside of the device main body 100. As connectors 34 are raised, tips 32 press against device main body 100, thereby causing them to be released from device 14.

Figure 12:
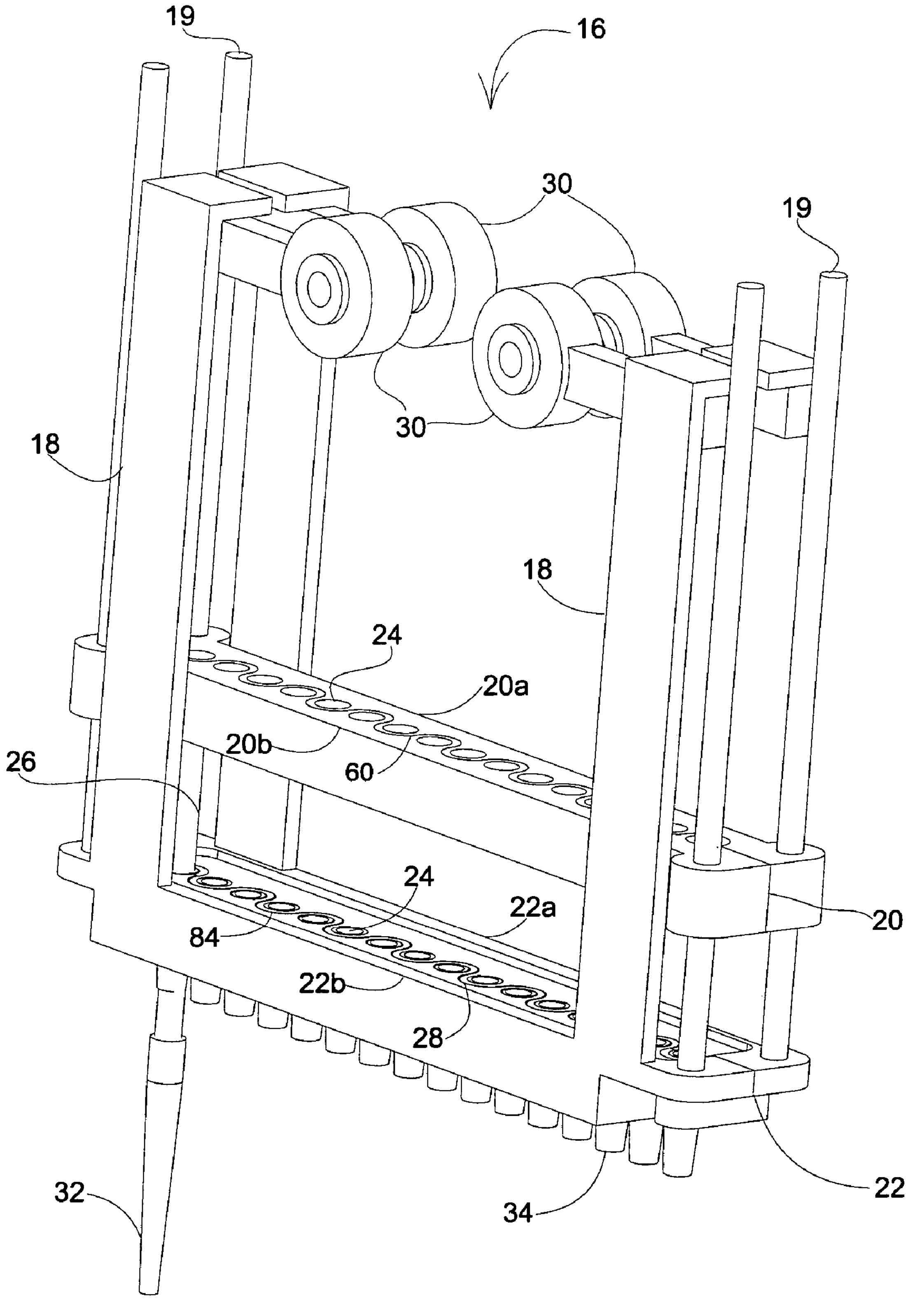
FIG. 12 represents a perspective view of a third preferred embodiment of the combinatorial device of the present invention, with the cover removed.
Figure 13:
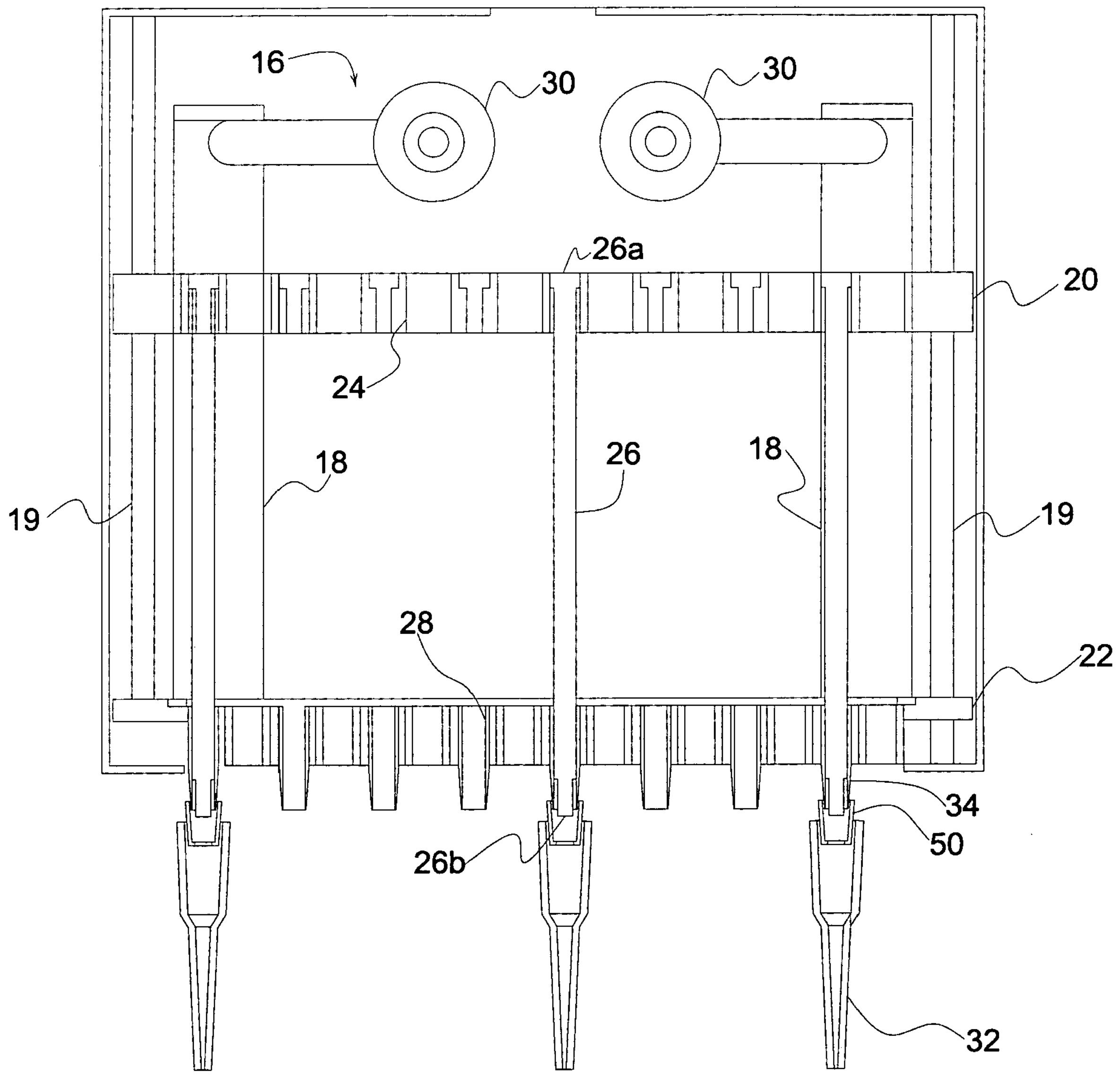
FIG. 13 represents a side view of the device of FIG. 12, with the cover removed.

A third preferred embodiment of the combinatorial device of the present invention is shown in FIGS. 12, 13, and 14. This embodiment is for a device for the separation and transfer of magnetic particles and it is similar to the first embodiment described, with the exception that the mechanism for the collection of magnetic particles is different. This difference will be further described below.

Certain features of the first embodiment described above will be better understood and appreciated with reference to FIGS. 12, 13, and 14. For example, it is now possible to see the complementary nature of the two halves of both the upper plate and the lower plate with one another. Each half of each plate comprises a plurality of projections 60, 84 which contain openings 24, 28 for receiving the proximal and distal ends 26*a*, 26*b* of magnetic elements 26. As seen in FIG. 14, the two plate halves 20*a*, 20*b* are complementary in shape to one another, and the projections of each half fit the projections of the other half along curved interface edge 102. All of openings 24 are thus located along the same longitudinal axis. Aside from openings 24 which are located at either end of the plate, each opening 24 is neighbored by a pair of openings (one on each side) from the opposite plate half.

In the embodiment illustrated in FIGS. 12 and 13, each half of upper plate 20 is switchable from an upper inactivated position to a lower activated position. Preferably, one or two external switches is provided for switching one or both halves of the upper plate to the activated position. In the activated position, the distal ends 26*b* of magnetic elements 26 are located inside of openings 28 of lower plate 22. Each half of upper plate 20 is adapted for moving along two pairs of poles 19.

Lower plate 22 is switchable between three positions: a lower pre-collecting position, a middle collecting position, and an upper tip-releasing position, to be described further below. Mechanism 16 is provided for switching one or both halves of lower plate 22 between the three positions.

Prior to operation of mechanism 16, one or both halves of upper plate 20 is activated such that the corresponding magnetic elements 26 become lowered. Initially, lower plate 22 is in the pre-collecting position. One or both halves of lower plate 22 is then raised slightly to the middle collecting position. Raising of one or both halves of lower plate 22 is effected by pressing on one or both halves of an actuator button coupled to mechanism 16 that pushes down on a pair of gears 30 coupled to a pair of supports 18.

When gears 30 are lowered, supports 18 become raised, thus raising the half of lower plate 22 which is coupled thereto. Since lower plate 22 has been raised with respect to magnetic elements 26, the distal ends 26*b* of magnetic elements 26 now extend through connectors 34 located on the bottom of lower plate reaching the end of attached collecting tips 32 so as to exert a magnetic force of the end of collecting tips 32. Thus, magnetic particles can be collected on the collecting tips.

In FIG. 12, only one magnetic element and collecting tip have been illustrated, for the purposes of simplicity and clarity only. In FIG. 13, three magnetic elements and collecting tips 32 are shown. When the magnetic particles are to be released into the target vessel, the actuator button or button half is released and the lower plate 22 or lower plate half is returned to the pre-collecting position, thereby positioning said lower plate 22 or lower plate half downward and displaced from the distal ends 26*b* of magnetic elements 26 and thus removing the magnetic force from the tips. When used tips are be released, the actuator button is pressed to a further extent than previously, such that the distal ends 26*b* of the magnetic elements 26 press against the collecting tips, causing their release.

It will be appreciated that a single mechanism serves both to collect and release the sample and also to release the used tips. This is highly advantageous since it contributes to the simplicity in design and ease-of-use of the device, and also lowers costs. This is also in contrast to regular pipettor, in which a separate mechanism needs to be used in order to release a used tip from the pipettor.

FIG. 13 illustrates a way for preventing the attachment of collecting tips to the device in positions which are not required. In this case, a tube member 50 is placed onto those connectors 34 to which the user desires that a collecting tip be attached, according to the number and position of magnetic particle samples that are be separated. Due to the added length, when the user presses the device into the tip box, collecting tips 32 will only become attached to those connectors 34 which have tube members 50 attached thereto. It will be appreciated that by not using extra tips, the separation process is simplified, tips are not wasted, and the user can more easily keep track of samples.

It will be appreciated that during operation of the device, the magnetic elements are fixed with respect to the upper plate, and they only move when the upper plate is moved. It will be appreciated that this feature facilitates usage of the device in microtiter plates having different numbers of wells. Various preferred embodiments for the magnetic elements employed in the present invention will now be described with respect to FIGS. 15*a*-15*d*.

Figures 15A, 15B, 15C, 15D:
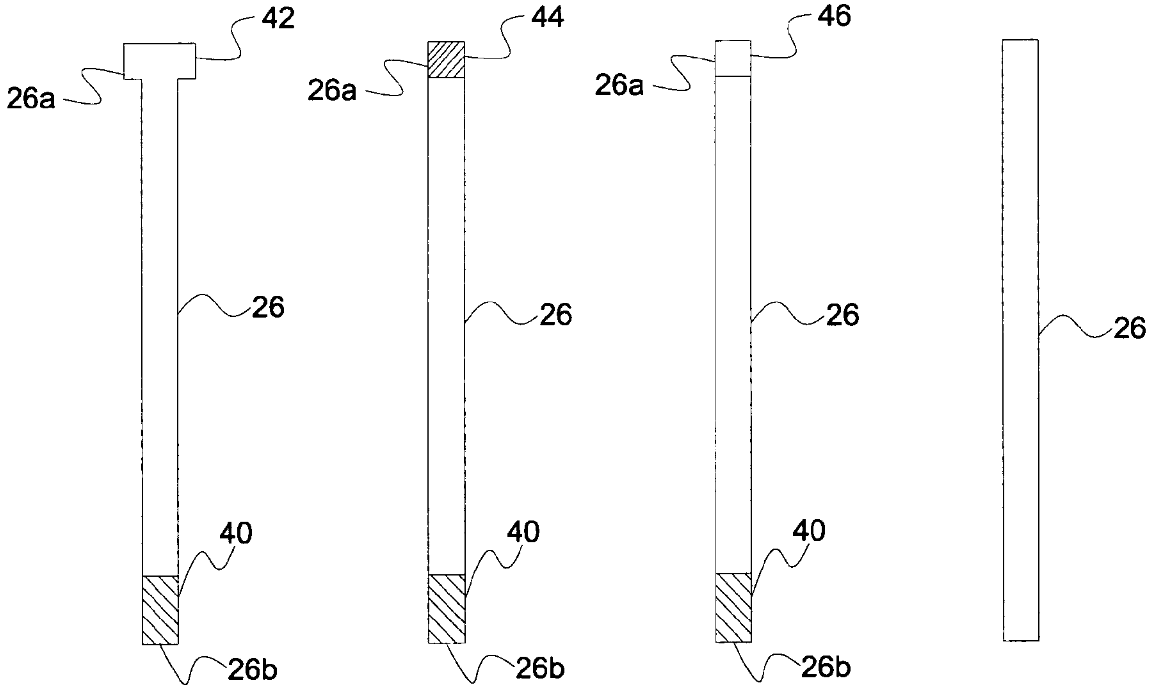
FIGS. 15*a*-15*d* represent schematic views of various preferred embodiments for a magnetic element employed in certain preferred embodiments of the combinatorial device of the present invention.

In certain embodiments of the present invention, specifically those where magnetic elements are provided already loaded in the device, the magnetic element preferably has the design illustrated in FIG. 15*a*. In this case, magnetic element 26 comprises a magnetic segment 40 located at the distal end 26*b* of magnetic element 26. The middle portion of magnetic element 26 is formed from a non-magnetic material such as aluminum. Magnetic element 26 also comprises a cap 42 located at the proximal end 26*a* that facilitates maintaining of magnetic element 26 on the upper plate of the device. To connect between magnetic segment 40 and the non-magnetic portion, a stainless steel (or other suitable material) sleeve (not seen) is preferably used.

In another preferred embodiment, illustrated in FIG. 15*b*, magnetic element 26 comprises a magnetic segment 40 located at the distal end 26*b* thereof, as well as a second magnetic segment 44 located at the proximal end 26*a* thereof. The two magnetic segments have the same size. In this case, the upper plate comprises an upper plate cover formed from a magnetizable material. Thus, when a magnetic element is inserted into the device (for example, through the tip connectors at the bottom of the device), the second magnetic segment of the magnetic element contacts the cover and is held in place on the upper plate due to the magnetic force exerted by the second magnetic segment 44 onto the cover.

The preferred embodiment illustrated in FIG. 15*c* is similar to that of FIG. 15*b*, with the exception that instead of a second magnetic segment, magnetic element 26 is provided with a magnetizable segment 46 at the proximal end 26*a*. In this case, the upper plate is provided with a cover formed from a magnetic material or the upper plate itself is formed from a magnetic material, so as to create a magnetic force between the magnetizable segment and the upper plate. The magnetizable segment can be formed, for example, from iron.

In yet another preferred embodiment, the entire magnetic element 26 is formed from a magnetic material. In this case, the upper plate is formed from a magnetizable material or the upper plate has a cover that is formed from magnetizable material.

Figure 16A:
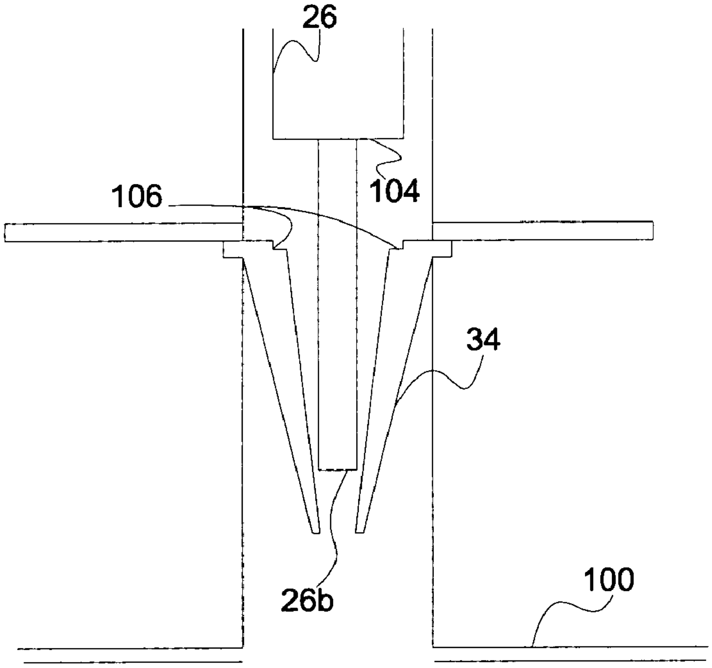
FIGS. 16*a* and 16*b* represent schematic views of sequential steps in the activation of a single tip connector via a magnetic element, according to certain preferred embodiments of the present invention.
Figure 16B:
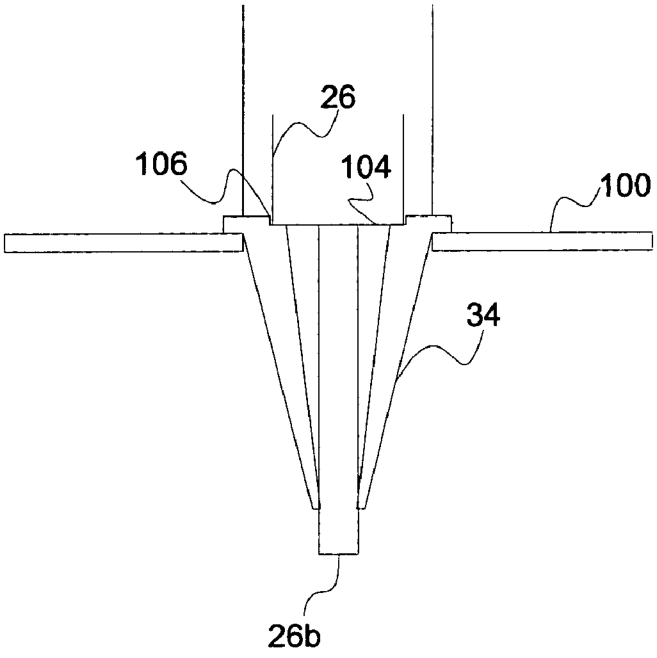

The device of the present invention can be provided with means whereby individual connectors are activated in an automatic manner, according to the presence or absence of a magnetic element at a specific device location. This is illustrated in FIGS. 16*a* and 16*b*. Initially, connector 34 is positioned inside of the device main body 100 (FIG. 16*a*). When a magnetic element 26 is lowered, it enters inside of connector 34 and contacts the inner sidewalls of connector 34, whose diameter is slightly smaller than the width of magnetic element 26.

Magnetic element 26 thus pushes against connector 34, and causes it to be lowered out of device main body 100. The upper portion 104 of the distal end 26*b* of magnetic element 26 then engages with the upper portion 106 of connector 34, inhibiting further downward movement of magnetic element 26. The distance which the magnetic elements are allowed to move, and the extent to which the connectors are lowered is pre-set such that the magnetic elements and connectors extend by an exact amount from the main body of the device in order to allow for collection of a sample.

Alternatively, in other embodiments, a pressable ring is provided within the connector. In this case, as the magnetic element is lowered, it presses against and expands the ring against the inner walls of the connectors. As the magnetic element is lowered, the connector is lowered along with it. Only those connectors where a magnetic element has entered are activated.

In the aforementioned cases, at least a portion of the magnetic elements are provided separate from the device, and the user inserts the appropriate number of magnetic elements into the device at required positions, according to the number and position of the samples on the micro-titer plate. In other preferred embodiments, magnetic elements are provided already housed within the device, and connectors can be activated or inactivated in one of the manners previously described.

It will be appreciated the device of the present invention could be designed and adapted for use with microtiter plates of any size, including, but not limited to, 96-well microtiter plates, 384-well microtiter plates, and 1536-well microtiter plates. Plates of any other size, such as 5×5 well PCR plates, could also be accommodated. The present invention provides a simple and easy-to-use solution for transferring liquids or magnetic particles between microtiter plates of different sizes. Moreover, the user has the ability to determine the specific number and combination of samples that are to be processed.

It will also be appreciated that using the device of the present invention, magnetic particles or liquids can be transferred from wells in a standard 96 well microplate to smaller wells in a standard 384 well plate and vice versa. There are 2 conditions necessary for such a transfer: the size and diameter must fit the smaller well and the number and combination of tips must fit the size and arrangement of wells in both microtiter plates. This is why 8 tips, or any combination ranging from 1 to 8, can be dipped into both microtiter plates, while 16 tips fit only the 384 well microplate. This also applies for 12 tips, that fit both microtiter plates even at any combination and number tips ranging from 1 to 12, but using both sets of 12 tips by activating both halves of the upper plate results in 24 tips that fit only a 384 well microplate.

The device of the present invention can be operated as described above either manually or electrically via a stepper motor or an electric actuator. In one embodiment, a separate motor or motors is provided for each half of each plate. In cases where it is operated electrically, it may still be a manual device with a suitable holder though optionally it can be part of an automatic machine controlled via computer.

Having described the invention with regard to certain specific embodiments thereof, it is to be understood that the description is not meant as a limitation, as further modifications will now become apparent to those skilled in the art, and it is intended to cover such modifications as are within the scope of the appended claims.

The invention claimed is:

1. A hand-held, adjustable combinatorial device for the collection of at least one sample, said device being adapted for use with microtiter plates of different sizes, comprising;

(a) an upper plate comprised of a first half and a second half, wherein each of said halves is independently movable between at least an upper position and a lower position;

(b) a lower plate having a plurality of tip connectors coupled thereto for facilitating attachment of at least one collecting tip;

(c) a plurality of sample collector members each having a proximal end and a distal end;

(d) a mechanism for moving at least one of said first half and said second half of the upper plate between said upper position and said lower position;

wherein the proximal ends of said sample collector members are held by said first and second halves of said upper plate and wherein the distal ends of the said sample collector members are adapted for being engaged by said lower plate such that when adjusted according to the number and position on a microtiter plate of one or more samples, at least one half of said upper plate is moved from said upper position to said lower position, causing the corresponding sample collector members to become lowered with respect to said lower plate, thereby facilitating collection of at least one sample into a collecting tip attached to one of said connectors.

2. The device according to claim 1, wherein each of said first half and said second half of said upper plate is adapted for accomodating eight sample collector members, for a total of sixteen sample collector members.

3. The device according to claim 1, wherein each of said first half and said second half of said upper plate is adapted for accommodating twelve sample collector members, for a total of twenty-four sample collector members.

4. The device according to claim 1, wherein each of said first half and said second half of said upper plate comprises a plurality of projections, the projections of the first half being complementary to the projections of the second half such that the two plate halves fit together, and wherein each of said projections comprises an opening for receiving the proximal end of a sample collector member.

5. The device according to claim 1, wherein the sample collector members comprise pins and wherein the lower plate comprises a plurality of pump units, said pins being adapted for engaging with and activating said pump units when at least one half of said upper plate is moved to said lower position such that a liquid can be collected into a collecting tip attached to one of said connectors.

6. The device according to claim 1, wherein the sample collector members comprise rod-shaped magnetic elements.

7. The device according to claim 6, wherein said lower position corresponds to a position in which the distal ends of said magnetic elements extend through said lower plate and into said tip connectors such that when a collecting tip is attached to a tip connector, a magnetic force is exerted by the distal end of the magnetic element onto the end of the collecting tip such that magnetic particles can be collected onto said collecting tip due to said magnetic force.

8. The device according to claim 6, wherein the mechanism comprises an actuator button comprising a first button half adapted for enabling moving the first half of the upper plate and a second button half adapted for enabling moving the second half of the upper plate.

9. The device according to claim 6, wherein at least a portion of said tip connectors are switchabte between an inactivated position and an activated position, said activated position corresponding to a position in which said tip connectors can be employed for collection of a sample when at least one collecting tip is attached thereto.

10. The device according to claim 9, wherein the lower plate comprises a first lower plate half and a second lower plate half, said first tower plate half having a plurality of tip connectors coupled thereto, said tip connectors being provided in the activated position.

11. The device according to claim 10, wherein the second lower plate half comprises a plurality of tip connectors provided in the inactivated position, and wherein the device further comprises means for switching said tip connectors to the activated position.

12. The device according to claim 11, wherein said means comprises a lock button, and wherein unlocking said lock button causes said second lower plate half to move downward, thus causing the corresponding tip connectors to switch from the inactivated position to the activated position.

13. The device according to claim 6, further comprising a release button for enabling release of used tips from the device, said release button operating by enabling said upper plate halves to be lowered such that the distal ends of the magnetic elements push against attached collecting tips, causing said collecting tips to become released from the tip connectors.

14. The device according to claim 6, wherein the magnetic element comprises a rod having a magnetic segment at both the proximal and distal end thereof, and wherein the middle portion of the rod comprises a non-magnetic material, and wherein the upper plate further comprises a magnetizable cover extending thereabove for holding the proximal ends of the magnetic elements.

15. The device according to claim 6, wherein the magnetic element comprises a rod having a magnetic segment at the distal end and a magnetizable segment at the proximal end, and wherein the middle portion of the rod comprises a non-magnetic material, and wherein the upper plate further comprises a magnetic cover extending thereabovefor holding the proximal ends of the magnetic element.

16. The device according to claim 6, wherein the magnetic element comprises a magnetic segment at the distal end thereof, a cap at the proximal end thereof, and a sleeve for connecting between said magnetic segment and the remainder of the magnetic element.

17. The device according to claim 6, wherein individual tip connectors are adapted for being inactivated by at least partially pushing said individual tip connector towards the lower plate.

18. The device according to claim 6, wherein individual tip connectors are adapted for being inactivated by disconnection of said individual tip connector from the lower plate.

19. The device according to claim 6, further comprising a mechanism for activating individual tip connectors wherein towering of an individual magnetic element into a tip connector causes said tip connector to switch to the activated position.

20. A method for collecting and transferring a sample from a microtiter plate, comprising:

providing a hand-held, adjustable combinatorial device for the collection and transfer of a sample, said device being adapted for use with microtiter plates of different sizes, said device comprising:

(a) an upper plate comprised of a first half and a second half, wherein each of said halves is independently movable between at least an upper position and a lower position;

(b) a lower plate having a plurality of tip connectors coupled thereto for facilitating attachment of at least one collecting tip;

(c) a plurality of sample collector members each having a proximal end and a distal end;

(d) a mechanism for moving at least one of said first half and said second half of the upper plate between said upper position and said lower position, wherein the proximal ends of said sample collector members are held by said first and second halves of said upper plate and wherein the distal ends of the said sample collector members are adapted for being engaged by said lower plate, and adjusting said device according to the number and position on a microtiter plate of one or more samples, wherein said adjusting is accomplished at least partially by moving at least one half of said upper plate from said upper position to said lower position such that the corresponding sample collector members are lowered with respect to said lower plate, thereby facilitating collection of at least one sample into a collecting tip attached to one of said connectors.

* * * * *